July 5, 1949. R. CHILTON 2,475,010
FLEXIBLE COUPLING
Filed July 20, 1944 2 Sheets-Sheet 2

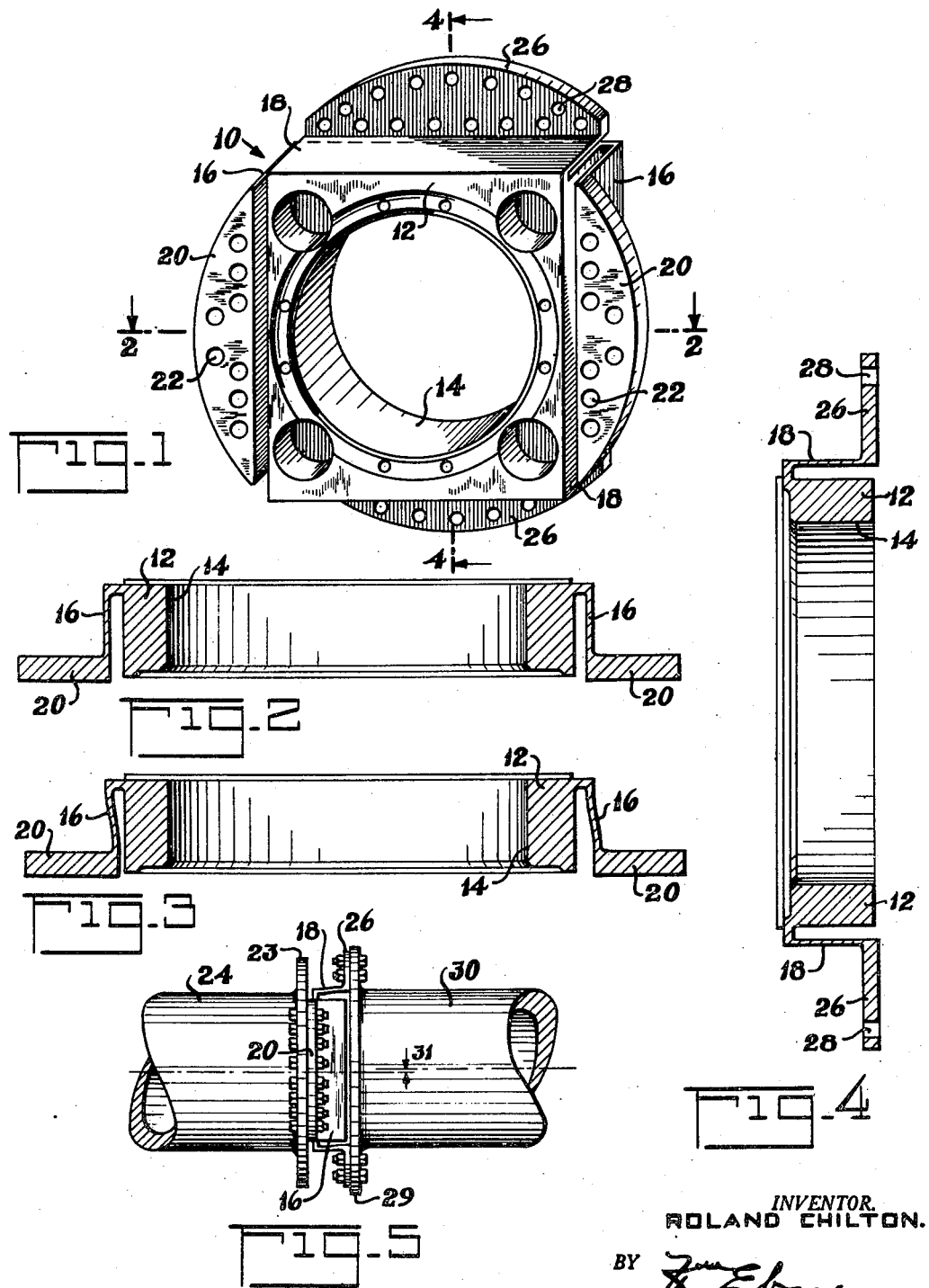

INVENTOR.
ROLAND CHILTON
BY
ATTORNEY

Patented July 5, 1949

2,475,010

UNITED STATES PATENT OFFICE 2,475,010

FLEXIBLE COUPLING

Roland Chilton, Ridgewood, N. J., assignor to Wright Aeronautical Corporation, a corporation of New York Application July 20, 1944, Serial No. 545,784

6 Claims. (Cl. 64—31)

This invention relates to flexible couplings, and is particularly directed to a torsionally rigid flexible coupling constructed to permit limited relative lateral displacement of a pair of shafts coupled thereby.

It is an object of this invention to provide a torsionally rigid flexible coupling of simple and compact construction capable of transmitting the large torque outputs of modern aircraft engines, although, as will appear, the invention is of general application. It is a further object of this invention to provide a flexible coupling construction which occupies very little space and which can readily be made from a single piece of material.

Specifically, the flexible coupling comprises a relatively rigid intermediate member to which one edge of each of two pairs of spaced parallel flexible blades are secured, said pairs of blades being disposed at right angles to each other and the shafts to be coupled together are each respectively connected to other edges of one of the two pairs of flexible blades.

Other objects of this invention will become apparent upon reading the annexed detailed description in connection with the drawing in which:

Figure 1 is a perspective view of one form of the invention;

Figure 2 is a sectional view along lines 2—2 of Figure 1;

Figure 3 is a sectional view similar to Figure 2 but with the flanges in a deflected position;

Figure 4 is a sectional view along lines 4—4 of Figure 1;

Figure 5 is a side elevation illustrating the coupling connected between the pair of shafts;

Figure 6:
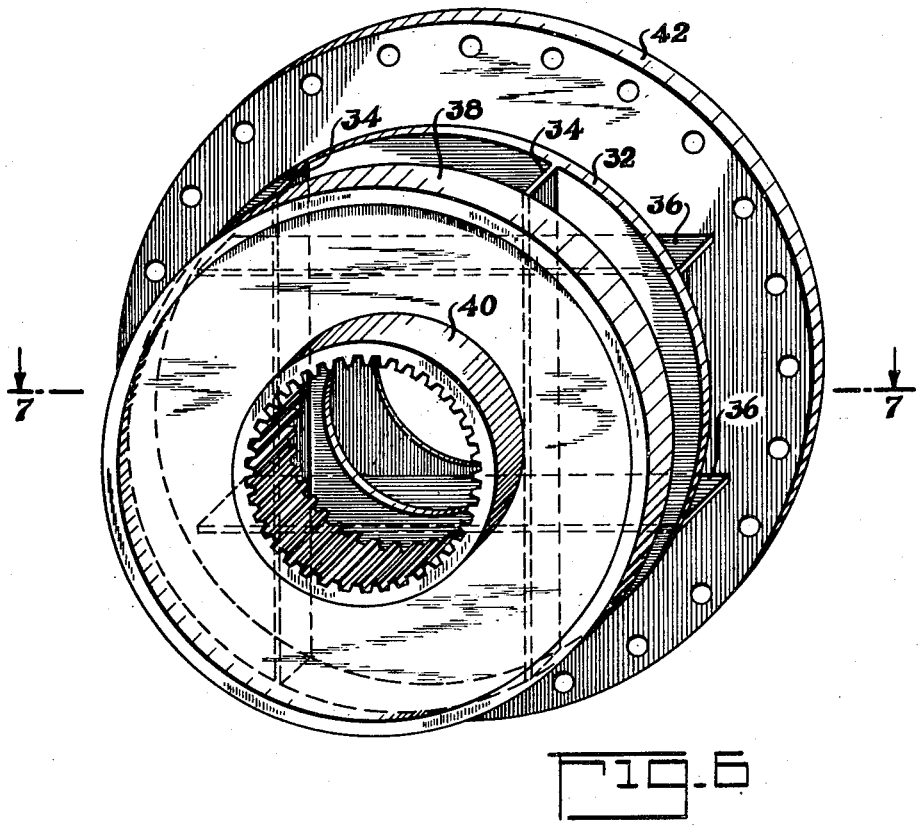
Figure 6 is a perspective view of a modification.

Referring to Figures 1 to 5, the flexible coupling 10 comprises a relatively rigid intermediate portion 12 having a square periphery and a bore 14 therethrough, together with numerous other drillings for decreasing the weight of this intermediate portion. A first pair of elongated parallel flexible blades are secured integrally as cantilever beams along one of their long edges to the intermediate portion 12 and are symmetrically disposed on opposite sides of the coupling axis, each with their short dimension or width disposed parallel to said axis and with their long dimension disposed transverse to said axis. A second pair of parallel elongated blades 18, similar to the blades 16, are secured to the intermediate portion 12 along one of their long edges and are symmetrically disposed on opposite sides of the coupling axis, but at right angles to the blades 16. Also, like the blades 16, the blades 18 have their short dimension or width disposed parallel to the coupling axis with their long dimension disposed transverse to the coupling axis, but these blades 18 extend from the intermediate portion in a direction opposite to that of the blades 16.

The pairs of blades 16 and 18 are each respectively secured to one end of the intermediate coupling portion 12, and each pair of blades extends in a direction parallel to the coupling axis toward the other end of the coupling. With this construction, the intermediate coupling portion 12 is substantially surrounded by the blades 16 and 18, thereby providing an exceptionally compact construction.

Each of the other long edges of the blades 16 are provided with a relatively heavy and rigid laterally extending flange 20 disposed in a common plane with each other, transverse to the coupling axis and at one end of the coupling. The flanges 20 are each provided with bolt holes 22, whereby these flanges may be securely bolted to a flange 23 on a shaft 24 which is one of the shafts to be coupled together. Similarly, the other long edges of the flexible blades 18 are each provided with a relatively heavy and rigid laterally extending flange 26 disposed in a common plane with each other, transverse to the coupling axis and at the end of the coupling. The flanges 26 are also each provided with bolt holes 28 whereby these flanges may be rigidly bolted to a flange 29 on a shaft 30, the other of the shafts to be coupled together.

With the above coupling construction, each pair of flexible blades permits limited relative lateral displacement of the shafts 24 and 30 in directions at right angles to each other, whereby the coupling permits limited relative lateral displacement of the shafts 24 and 30 in any direction perpendicular to the coupling axis. However, the long blades 16 and 18 are extremely rigid against longitudinal shear, thereby making the coupling extremely rigid against rotational deflections about the coupling axis, and providing a torsionally rigid connection between the shafts 24 and 30. The manner in which the blades deflect is best seen in Figure 3 in which for reasons of clarity the deflection has been exaggerated. With the flanges 20 and 26 each secured to the relatively heavy rigid member, as the flanges 23 and 29 respectively, and with a rigid intermediate coupling portion 12, there can be no relative angular deflection of the shafts 24 and 30. That is, the coupling is only designed to permit relative lateral displacement of the shafts 24 and 30, e. g., as illustrated at 31, Figure 5, by the relative displacement of the axes of these shafts. In fact, one of the flexible blades 16 or 18 would have to buckle before any relative angular displacement of the shafts 24 and 30 could take place. Another feature of the above coupling construction is that the coupling can readily be machined from a single piece of material by simple milling operations.

Figure 7:
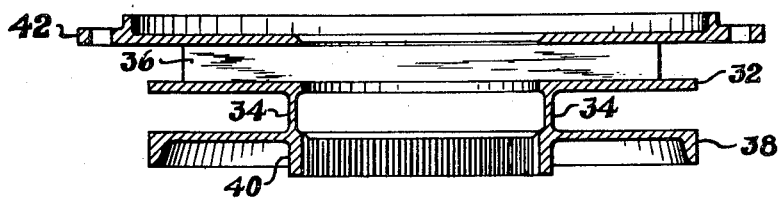
Figure 7 is a sectional view taken along line 7—7 of Figure 6.

Referring now to the modification of Figures 6 and 7, an annular intermediate member 32 is provided with a first pair of elongated parallel flexible blades 34. The blades 34 are formed integral with one side of the intermediate member 32 along one of their long edges and are symmetrically disposed on opposite sides of the coupling axis with the short dimension or width of said blades extending from said intermediate member parallel to the coupling axis. A second pair of parallel flexible blades 36 are secured integrally with the opposite sides of the intermediate member 32 along one of their long edges and are symmetrically disposed on opposite sides of the coupling axis with their short dimension or width extending from said intermediate member parallel to the axis of the coupling, but in a direction opposite to that of the first pair of blades 34. In addition, the two pairs of blades 34 and 36 are disposed at right angles to each other and across each other as illustrated.

The other long edges of the pair of blades 34 are integral with an annular member 38 provided with an internally splined hub 40 which is adapted to be drivably connected to one of the shafts to be coupled together. The other long edges of the pair of blades 36 are integral with an annular member 42 which is adapted to be bolted or otherwise secured to the other of the shafts to be coupled together.

The coupling of Figures 6 and 7 like that of Figures 1-5 can readily be machined from a single piece of metal by simple machining operations, and in addition provides a torsionally rigid coupling which permits limited lateral displacement of a pair of shafts with their axes remaining parallel to each other. The coupling of Figures 6 and 7 occupies somewhat more axial space than the coupling of Figures 1 to 5 since each of the two pairs of flexible blades extend axially away from the intermediate coupling portion instead of overlying this portion. However, the construction of Figures 6 to 7 has the advantage, in that the blades 34 to 36 cross each other, thereby adding to the rigidity of the intermediate coupling member 32. With either of the aforedescribed modifications there is provided a simple, one-piece torsionally rigid coupling which provides for limited parallel lateral deflections between the shafts connected thereby.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. Coupling means for a pair of shafts comprising an intermediate coupling portion, a first pair of elongated parallel flexible blades symmetrically disposed on opposite sides of the coupling axis, a second pair of elongated parallel flexible blades symmetrically disposed on opposite sides of the coupling axis and disposed at right angles to said first pair of blades, each of said blades having its long dimension disposed transverse to the coupling axis and having one of its long edges integral with said intermediate portion along substantially the entire length of each of said long edges, each pair of blades having their short dimensions extending from said intermediate portion in a direction parallel to said coupling axis but opposite to the other pair, means adapted to connect the other long edges of said first pair of blades with one of the shafts to be coupled together, and means adapted to connect the other long edges of said second pair of blades with the other of the shafts to be coupled together.

2. Coupling means for a pair of shafts comprising a coupling portion disposed transverse to the coupling axis, a first pair of elongated parallel flexible blades disposed symmetrically on opposite sides of the coupling axis in planes parallel thereto, a second pair of elongated parallel flexible blades disposed symmetrically on opposite sides of the coupling axis in planes parallel thereto and at right angles to said first pair, each of said blades having its long dimension disposed transverse to said coupling axis and having one of its long edges integral with said coupling portion along substantially the entire length of each of said long edges, each pair of blades having their short dimensions extending from said coupling portion in a direction opposite to the other pair, means adapted to connect the other long edges of said first pair of blades with one of the shafts to be coupled together, and means adapted to connect the other long edges of said second pair of blades with the other of the shafts to be coupled together.

3. Coupling means for a pair of shafts comprising a first pair of parallel flexible blades, a second pair of parallel flexible blades, each blade having a pair of spaced edges, said pairs of blades being axially spaced and being disposed at right angles to each other in crossing relationship with the blades of each pair symmetrically disposed on opposite sides of the coupling axis, and means disposed between said crossing pairs of blades integral with the adjacent one of said spaced edges of each of said blades, the other of said spaced edges of the blades of said first pair being adapted to be connected to one of the shafts to be coupled together and the other of said spaced edges of the blades of said second pair being adapted to be connected to the other of the shafts to be coupled together.

4. Coupling means for a pair of shafts comprising an intermediate coupling portion, a first pair of parallel flexible blades disposed on opposite sides of said portion, a second pair of parallel flexible blades disposed on opposite sides of said portion and displaced 90° about said portion from said first pair, each blade of said first pair having a pair of spaced edges of which one edge is rigid with one end of said portion and each said blade extends beyond the other end of said portion, each blade of said second pair having a pair of spaced edges of which one edge is rigid with said last mentioned end of said portion and each said blade extends beyond said first mentioned end, means adapted to connect the other of said spaced edges of said first pair of blades to one of the shafts to be coupled together, and means adapted to connect the other of said spaced edges of said second pair of blades to the other of the shafts to be coupled together.

5. In a coupling for a pair of shafts; a first pair of rectangular flexible blades disposed in spaced parallel planes; a second similar pair of blades disposed in spaced parallel planes at right angles to said first mentioned planes, the blades of each pair being symmetrically disposed on opposite sides of the coupling axis with each blade being elongated in a direction transverse to said axis; and a relatively inflexible member rigidly connected to one of the long edges of each of said blades along substantially the entire length of each of said long edges, the other long edges of each pair of blades being adapted to be connected to one of said pair of shafts.

6. A one-piece coupling for a pair of shafts: said coupling comprising a first pair of flexible rectangular blades disposed in spaced parallel planes; a second similar pair of blades rotated 90° from said first pair; an intermediate coupling portion integral with one long edge of each of said blades along substantially the entire length of said long edges; and a pair of shaft-engaging coupling portions each integral with the other long edges of one of said pairs of blades.

ROLAND CHILTON.

REFERENCES CITED

The following references are of record in the file of this patent:

UNITED STATES PATENTS

| Number | Name | Date |
|---|---|---|
| 1,557,958 | Anderson | Oct. 20, 1925 |
| 1,639,481 | Baumann | Aug. 16, 1927 |
| 2,151,477 | Lee | Mar. 21, 1939 |